United States Patent
Zhang et al.

(10) Patent No.: US 10,601,296 B2
(45) Date of Patent: Mar. 24, 2020

(54) MULTI-DEGREE-OF-FREEDOM MOTOR DESIGN WITH REDUCED NUMBER OF ELECTROMAGNETIC CONTROL PHASES

(71) Applicant: HANGZHOU ZERO ZERO TECHNOLOGY CO., LTD., HangZhou, Zhejiang (CN)

(72) Inventors: Tong Zhang, HangZhou (CN); Qicheng Li, Hangzhou (CN); Mengqiu Wang, Hangzhou (CN); Wei Sun, Hangzhou (CN); Lixin Liu, Hangzhou (CN)

(73) Assignee: HANGZHOU ZERO ZERO TECHNOLOGY CO., LTD., HangZhou (CN)

( * ) Notice: Subject to any disclaimer, the term of this patent is extended or adjusted under 35 U.S.C. 154(b) by 0 days.

(21) Appl. No.: 16/078,580

(22) PCT Filed: Feb. 21, 2017

(86) PCT No.: PCT/IB2017/050984
§ 371 (c)(1),
(2) Date: Aug. 21, 2018

(87) PCT Pub. No.: WO2017/145051
PCT Pub. Date: Aug. 31, 2017

(65) Prior Publication Data
US 2019/0068041 A1    Feb. 28, 2019

Related U.S. Application Data
(60) Provisional application No. 62/300,384, filed on Feb. 26, 2016.

(51) Int. Cl.
*G03B 17/00*     (2006.01)
*H02K 41/035*     (2006.01)
*H02K 41/03*     (2006.01)
(Continued)

(52) U.S. Cl.
CPC ....... *H02K 41/0354* (2013.01); *G03B 17/561* (2013.01); *H02K 11/33* (2016.01); *H02K 41/031* (2013.01); *H02K 2201/18* (2013.01)

(58) Field of Classification Search
CPC ........ G03B 5/00; G02B 27/646; H02K 11/33; H02K 41/0354
(Continued)

(56) References Cited

U.S. PATENT DOCUMENTS 5,798,590 A *   8/1998   Sakakibara .......... H02K 41/031
                                                         310/156.19
6,374,049 B1 *   4/2002   Fujinaga ................ G03B 17/02
                                                         396/55
(Continued)

FOREIGN PATENT DOCUMENTS

CN         101777851 A       7/2010
CN         102075042 A       5/2011
(Continued)

OTHER PUBLICATIONS

International Search Report (PCT/IB2017/050984); dated Jun. 16, 2017.
(Continued)

*Primary Examiner* — Rodney E Fuller
(74) *Attorney, Agent, or Firm* — Howard & Howard Attorneys PLLC

(57) ABSTRACT

Disclosed herein are methods for a multiple degree-of-freedom (DOF) motor system with reduced number of electromagnet control phases. The motor system includes a first body that is able to move relative to a second body along multiple DOFs. The first body has at least one magnetic positioner attached. The second body has a plurality of controlled electromagnets. Control signals, the total number of phases of which is less than half the total number of
(Continued)

electromagnets, energize at least one of the controlled electromagnets to create magnetic interaction with at least one magnetic positioner on the first body, and to control the movement of the first body relative to the second body along designated dimension(s).

20 Claims, 7 Drawing Sheets

(51) Int. Cl.
  *H02K 11/33* (2016.01)
  *G03B 17/56* (2006.01)
(58) Field of Classification Search
  USPC .......................................................... 396/428
  See application file for complete search history.

(56) References Cited

U.S. PATENT DOCUMENTS

| | | | | |
|---|---|---|---|---|
| 8,991,527 | B2* | 3/2015 | Patti | H02K 41/031 180/7.1 |
| 9,178,393 | B2* | 11/2015 | Yano | H02K 41/031 |
| 2003/0178901 | A1* | 9/2003 | Erten | H02K 3/26 310/112 |
| 2009/0161240 | A1* | 6/2009 | Chang | G02B 7/021 359/824 |
| 2011/0097062 | A1* | 4/2011 | Tsuruta | G02B 7/022 396/55 |
| 2016/0223780 | A1* | 8/2016 | Baek | G02B 7/10 |

FOREIGN PATENT DOCUMENTS

| | | |
|---|---|---|
| CN | 202160025 U | 3/2012 |
| CN | 104836408 A | 8/2015 |
| JP | 2006033978 A | 2/2006 |
| JP | 2012105395 A | 5/2012 |

OTHER PUBLICATIONS

Written Opinion of the International Searching Authority (PCT/IB2017/050984); dated Jun. 16, 2017.

* cited by examiner

US 10,601,296 B2

MULTI-DEGREE-OF-FREEDOM MOTOR DESIGN WITH REDUCED NUMBER OF ELECTROMAGNETIC CONTROL PHASES

CROSS-REFERENCE TO RELATED APPLICATION

This application is a National Phase of PCT Application No. PCT/IB2017/050984, filed Feb. 21, 2017, which claims priority to U.S. Provisional Patent Application No. 62/300,384, filed Feb. 26, 2016, the disclosures of which are hereby incorporated by reference in their entirety.

FIELD OF THE DISCLOSURE

This present invention relates to the field of electromagnetically controlled multiple degree-of-freedom system, in particular the application of electromagnetically controlled planar motion stage and spherical motor.

BACKGROUND OF THE INVENTION

The trend of smart hardware and portable device makes miniaturized actuators development more motivational and intriguing in modern industries. Applications like smart robot and auto-stabilized gimbal require simultaneous controls in multiple degrees of freedom (DOF). In a conventional actuator system design, it takes multiple single-DOF actuators being combined into one assembly to achieve multi-DOF in forms of translation and/or rotation. However this approach inherently hinders further compactness and miniaturization of the actuator design.

Alternatively, mechanisms with intrinsic multi-DOFs movements capability within a single joint, such as ball-joint-like (spherical) actuators, show advantages in creating a more compact and elegant multi-DOF actuator system design. Several spherical actuator designs have been demonstrated during the last two decades, including permanent magnet spherical motor, spherical induction motor, variable-reluctance spherical motor, and ultrasonic spherical motor, etc. These actuators can provide position and/or velocity controls in two DOFs (pan and tilt), or even three DOFs (pan, tilt, and spin) by utilizing electromagnetic forces.

Taking permanent magnet spherical motor as an example, such actuator consists of a rotor with multiple number of permanent magnetic poles, and a stator with multiple number of electromagnetically driven coils. As control current signals go through the coils, magnetic forces and torques are generated to orientate the rotor towards its minimal system potential energy. Additional sensors such as encoders, Hall effect sensors, and magnetic field intensity sensors, etc. can be applied to measure and update the orientation and/or rotational speed of the rotor relative to the stator, and inverse kinematics can be used to update the control current signals to make it a closed-loop system.

Although showing superiority comparing to brute force combination of single-DOF actuators, a state-of-the-art spherical actuator still needs independent control and driving signals on each (or each pair of) electromagnetic coil(s). As the requirements of orientation/rotational speed control become more precise and strict, greater number of coils is desired, which leads to larger and more bulky electronic driving circuit design. This becomes one of the major barriers in making a miniaturized multi-DOF actuator design, counteracting its advantages in mechanism aspect.

What is needed is a smarter control strategy that requires fewer number of phases (or channels) of electromagnetic control signals, which will be put forth as solutions in the next section.

The present invention is aimed at one or more of the problems identified above.

SUMMARY OF THE INVENTION

In general, the present invention includes a multi-DOF motor system with reduced number of electromagnet control phases. The motor system includes a first body that is able to move relative to a second body along multiple DOFs. The first body has at least one magnetic positioner attached. The second body has a plurality of controlled electromagnets. Control signals, the total number of phases of which is less than half the total number of electromagnets, energize at least one of the controlled electromagnets to create magnetic interaction with at least one magnetic positioner on the first body, and to control the movement of the first body relative to the second body along designated dimension(s).

In various embodiments of the present invention, each positioner attached to the first body may be a permanent magnet, an electromagnet, magnetically attracted material, or the like; each electromagnet attached to the second body may be an air-core coil, soft-iron-core coil, or the like. The mating surface between the first body and the second body may be planar in a two-dimensional embodiment, the DOFs of which to control may include two degrees of translation, and one degree of rotation. The mating surface may also be spherical (convex or concave) in a three dimensional embodiment, the DOFs of which to control may include up to three degrees of rotation.

In yet another embodiment, additional device and/or component, such as a camera, may be attached to the first body or the second body.

In still another embodiment of the present invention, additional sensors such as encoders, infrared proximity sensors, Hall effect sensors, gyros, accelerometers, and magnetic field intensity sensors, etc., may be equipped to the system to monitor the status of movement of the first body relative to the second body. The attributes of measurement include but not limited to position, velocity, acceleration, orientation, angular speed, angular acceleration along designated dimension(s).

Control signals, the number of phases/channels of which is less than half the total number of electromagnets, energize the electromagnets that are attached to the second body of the system, and to control the movement of the first body relative to the second body along designated dimension(s). In an exemplary embodiment, the electromagnets attached to the second body are arranged in a rectangular array pattern with four control signal phases; in another exemplary embodiment, the electromagnets are arranged in a hexagonal array pattern, also with only four control signal phases. By choosing the correct pitch size of the electromagnet array, both arrangements may achieve high accuracy and singularity-free motion control of the first body relative to the second body along designated dimension(s).

In one embodiment of the present invention, a multi-degree-of-freedom motor system is provided. The multi-degree-of-freedom motor system includes a rotor, a stator, and a controller. The rotor includes a rotor body and a plurality of magnetic positioners coupled to the rotor body. The stator includes a stator housing and a plurality of electromagnetic coils positioned within the stator housing. The plurality of electromagnetic coils are arranged in a plurality of coil groups, with each coil group including a predefined number of electromagnetic coils being arranged in a predefined pattern. The controller transmits control signals to each of the plurality of electromagnetic coils, the controller configured to transmit the control signals including a number of driving signal phases that is less than a total number of electromagnetic coils included in the stator.

In yet another embodiment, a method of assembling a multi-degree-of-freedom motor system is provided. The method includes the steps of providing a rotor including a rotor body, coupling a plurality of magnetic positioners to the rotor body, providing a stator including a stator housing, and coupling a plurality of electromagnetic coils to the stator housing. The plurality of electromagnetic coils being positioned within the stator housing. The plurality of electromagnetic coils are arranged in a plurality of coil groups, with each coil group including a predefined number of electromagnetic coils being arranged in a predefined pattern. The method also includes coupling a controller in communication with each the plurality of electromagnetic coils. The controller transmits control signals to each of the plurality of electromagnetic coils and is configured to transmit the control signals including a number of driving signal phases that is less than a total number of electromagnetic coils included in the stator.

In a further embodiment, a camera assembly is provided. The camera assembly includes a rotor, a camera module coupled to the rotor, a stator, and a controller. The rotor includes a rotor body and a plurality of magnetic positioners coupled to the rotor body. The stator includes a stator housing and a plurality of electromagnetic coils positioned within the stator housing. The plurality of electromagnetic coils are arranged in a plurality of coil groups, with each coil group including a predefined number of electromagnetic coils being arranged in a predefined pattern. The controller transmits control signals to each of the plurality of electromagnetic coils. The controller configured to transmit the control signals including a number of driving signal phases that is less than a total number of electromagnetic coils included in the stator.

In an exemplary embodiment, each control signal phase may be driven by a full H-bridge circuit. By gathering the information from the calculated forward kinematic model, the movement measurements, and the control target, an inverse kinematics step may be performed to obtain desired control signal commands, achieving online closed-loop control of the system.

BRIEF DESCRIPTION OF THE FIGURES

For a more complete understanding of the invention, reference is made to the following description and accompanying drawings, in which.

Figure 1:
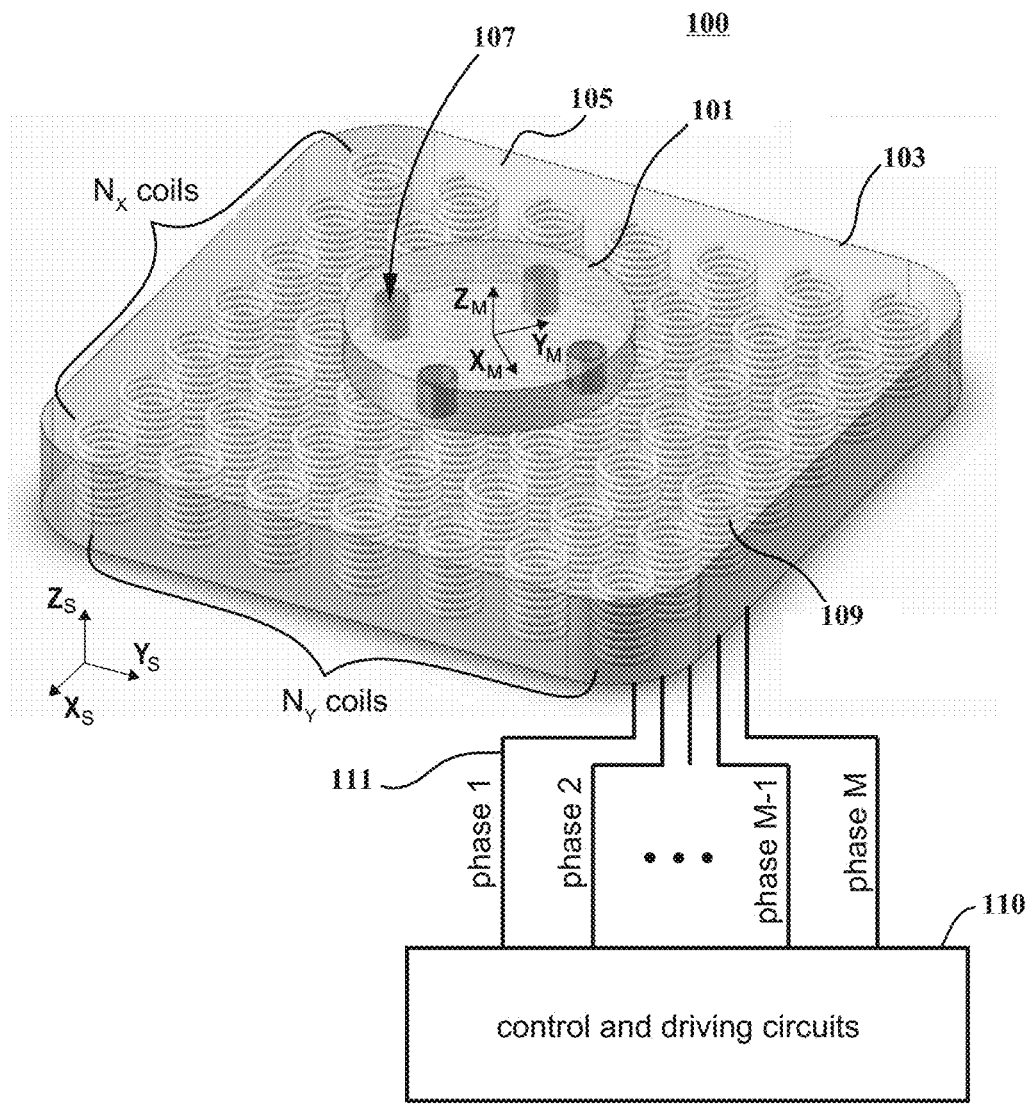
FIG. 1 illustrates a perspective view of a preferred embodiment of the present invention as a two-dimensional planar motion stage.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description of preferred embodiments of the invention is to allow any person skilled in the art of electromagnetically controlled multi-DOF system to make and use this invention, but not intended to limit the invention to these preferred embodiments.

FIG. 1 depicts an exemplary preferred embodiment of the present invention as a two-dimensional planar motion stage. The stage comprises a first body, the movable platform 101, and a second body, the base 103. The mating surface between the movable platform 101 and the base 103 is a plane 105, and the movable platform 101 can move relative to the base 103 along this mating plane 105 with two degrees of translation and one degree of rotation. As the base 103 is placed horizontally, the movable platform 101 can simply sit on the base 103 by gravity. Other extra geometric/physical constraints such as a ceiling component on top may be added to the system to enforce planar movement of the movable platform 101 relative to the base 103. The base 103 sits in a set of stationary coordinates $X_S$, $Y_S$, and $Z_S$, and the movable platform 101 has its own local coordinates: $X_M$, $Y_M$, and $Z_M$. In this planar case, $Z_S=Z_M$.

A plurality of cylindrical magnets 107 are attached to the movable platform 101. A plurality of electromagnets 109 are attached to the base 103. In this particular preferred embodiment, the coils are arranged in a rectangular array pattern. As electrical driving current goes through each coil, attractive or repulsive electromagnetic force may be exerted on each magnet 107. The forces exerted on the magnets provides force and torque, and essentially contribute to the net acceleration and angular acceleration of the base 103 to generate motions along designated dimensions. The total $N_x \times N_y$ coils are controlled by a controller 110 transmitting M driving signal phases 111. The number of driving signal phases 111 may be much less than the total number of coils in the design. And it is not necessary to control each (or each pair of) coil(s) independently as per state-of-the-art technology of electromagnetically controlled multi-DOF system. Mathematically, we denote this condition as:

$$M_{phases} < \frac{1}{2}(N_x \times N_y) \qquad \text{Equation 1:}$$

Figure 2:
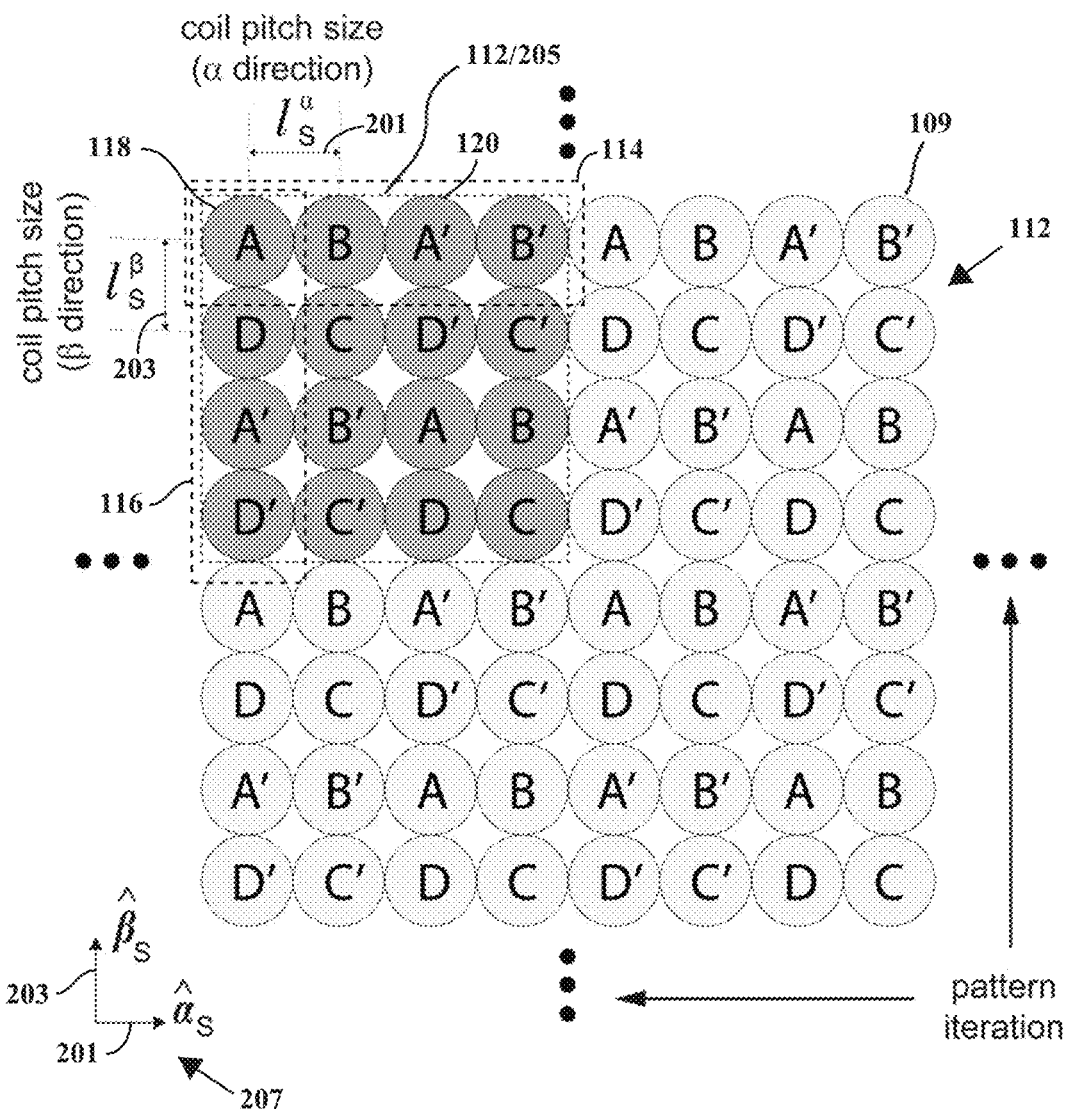
FIG. 2 shows an exemplary design configuration of the electromagnetic driving signal phases arrangement, being a rectangular array pattern.

In an exemplary embodiment of the present invention, as shown in FIG. 2, electromagnetic coils 109 in a rectangular-array configuration are controlled by a total of 4 driving phases (A, B, C, or D). Each electromagnetic coil 109 is denoted by a circle, and each letter inside the circle stands for the phase of the coil control signal. A letter with symbol prime (') stands for reversed driving current direction, and a letter without symbol prime stands for forward driving current direction. The coil pitch size along α direction 201, $l_S^\alpha$, and the coil pitch size along β direction 203, $l_S^\alpha$, are the same for the convenience of modeling of the control system. Other embodiments of the invention may also accommodate different pitch sizes along different dimensions. An array of 4×4 coils forms a unit pattern 205 for the rectangular-array configuration. The pattern 205 may iterate along either dimension 207 ($\hat{\beta}_S$ and/or $\hat{\alpha}_S$) to form a larger array of coils, still with only 4 phases in total.

Figure 3:
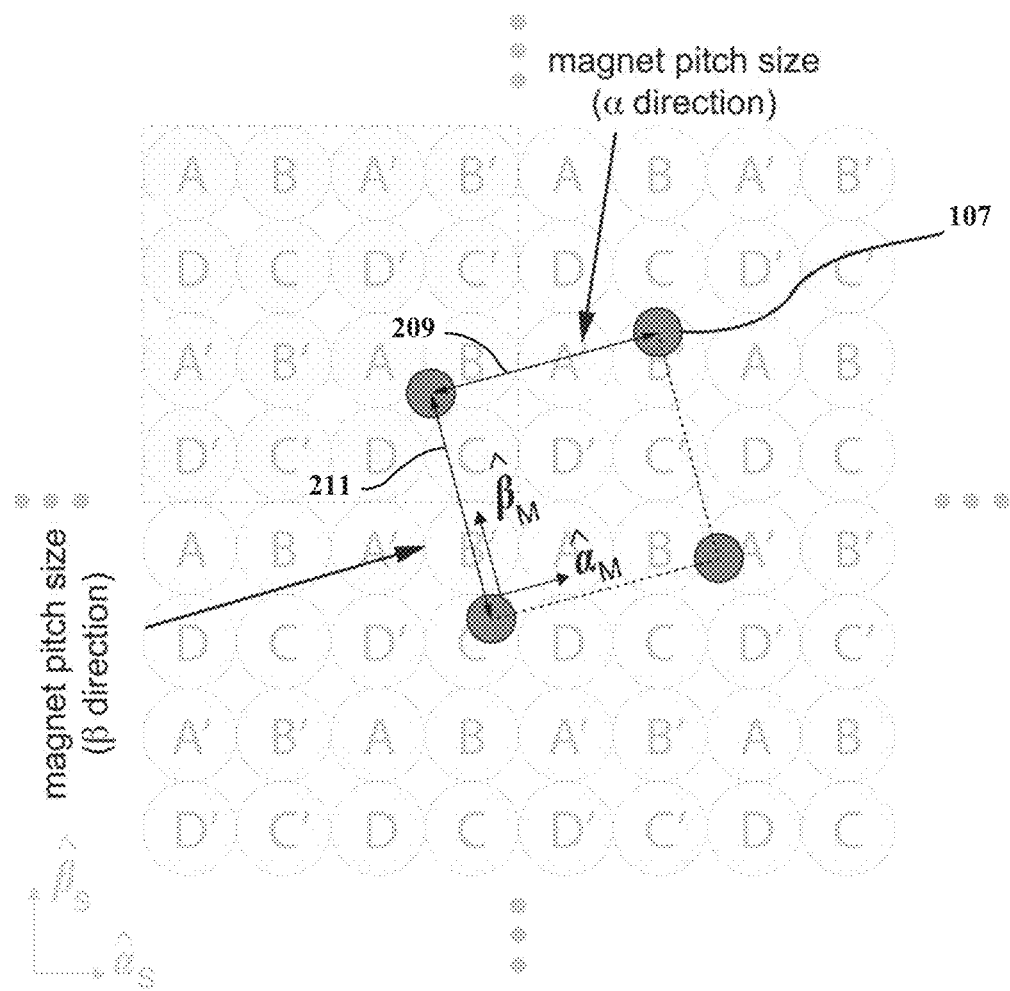
FIG. 3 illustrates an exemplary design configuration of the positioners, which are placed on the first body of the preferred embodiment of the present invention as shown in FIG. 1.

As shown in FIG. 3, cylindrical magnets 107 may also be arranged in a rectangular array pattern. Again, for modeling convenience, we set the magnet pitch size along α direction 209, $l_M^\alpha$, equal to the magnet pitch size along β direction 211, $l_M^\beta$.

Figure 4:
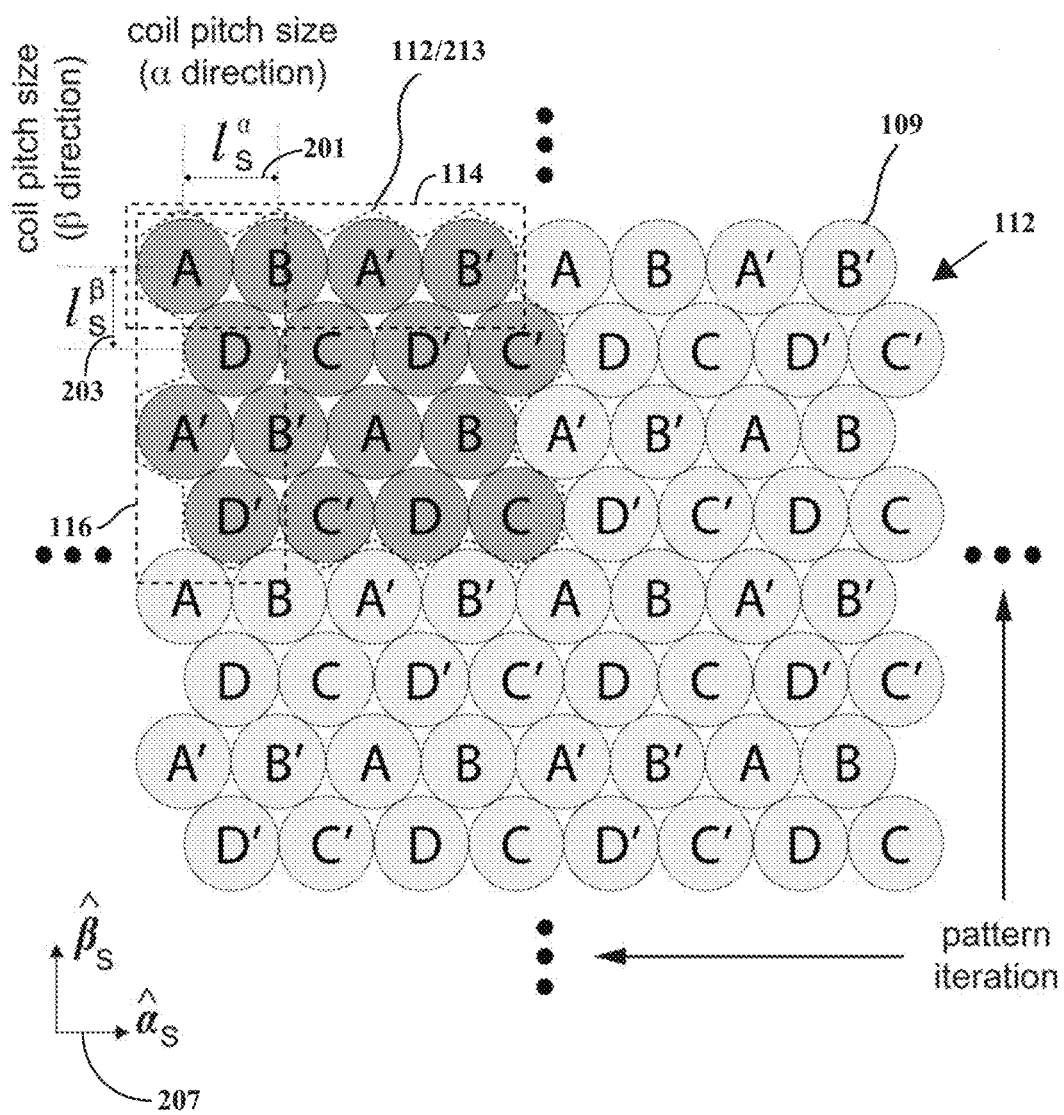
FIG. 4 shows another exemplary design configuration of the electromagnetic driving signal phases arrangement, being a hexagonal array pattern.

To further increase electromagnetic energy density for larger force and torque generation of the present multi-DOF motor invention, a preferred embodiment of hexagonal-array pattern may be utilized for arranging the coils electromagnetic coil 109, as shown in FIG. 4. The control signal arrangement also only requires 4 phases. A staggered array of 4×4 coils forms a unit pattern 213 for the hexagonal-array configuration. Denote the radius of the electromagnetic coil as $r_c$. Comparing the stacking densities of rectangular-array pattern 205 and hexagonal-array pattern 213, the rectangular-array pattern 205 provides a density of:

$$E_r = \frac{\pi r_c^2}{2 r_c^2} = 78.5\% \qquad \text{Equation 2}$$

With the hexagonal-array pattern 213, the stacking density can be increased by:

$$E_h = \frac{\frac{1}{2}\pi r_c^2}{\frac{1}{2} \cdot 2r_c \cdot \sqrt{3}\, r_c} = 90.7\% \qquad \text{Equation 3}$$

Given the locations $P_{m_i}^M = [x_{m_i}^M, y_{m_i}^M]$ of each magnet i in local coordinates of the movable platform 101 ($N_m$ in total), the locations $P_{c_j}^S = [x_{c_j}^S, y_{c_j}^S]$ of each coil j in coordinates of the base 103 ($N_c$ in total), the relative position $P_M^S(x, y)$ and orientation $\theta_M^S$ of the movable platform 101 in base's coordinates, and the gap d between the magnet surface and the coil surface, one can obtain the position vectors $^S P_{m_i}^{c_j}(x, y, \theta)$ or $^M P_{m_i}^{c_j}(x, y, \theta)$ from each magnet to each coil. The coordinate transformation matrix T can also be obtained accordingly.

Next, if given the magnetic flux density of each magnet $B_i$ and the current flow through each electromagnetic coil $I_j$, we can calculate the force exerted from each coil to each magnet.

By utilizing state-of-the-art methods such as distributed multipole model (DMP), the magnetic flux density of ith permanent magnet $B_i \in \mathbb{R}^{3\times 1}$ can be formulated.

To specify a coil in this configuration, we need $r_0$, the inner diameter of the coil, $r_1$, the outer diameter of the coil, and h, the height of the coil, besides its location $P_{c_j}^S = [x_{c_j}^S, y_{c_j}^S]$ in base coordinates.

Lorentz force law for force on a current-carrying wire states that:

$$F = I \int dl \times B \qquad \text{(Equation 4)}$$

where F is the net force, $d\ell$, is an infinitesimal segment of wire, I is the current flow, and B is the magnetic flux density. The differential sectional area of line segment $d\ell$ can be calculated as ds=dhdr, and the current passing through this section area is Jdhdr, where J is the current density in the section area of the coil. Note that the movable platform is constrained to move along the x-y plane, only the z-direction component of the flux density $B_z$ contributes to the total force and torque on the moving platform. According to Lorentz force law, the differential force on the moving platform caused by the interaction between the magnetic field of the magnet and current-carrying conductor (the coil) is:

$$dF = -I dl \times B_z(x,y,\theta)\hat{Z}_S = -J dh dr dl \times B_z(x,y,\theta)\hat{Z}_S \qquad \text{(Equation 5)}$$

where $\hat{Z}_S$ is the unit vector in the z-direction of Cartesian coordinates of the base, and dF is the differential force in x-y plane in base coordinates. Integrating on entire coil volume for analyzing total force exerted from jth coil on ith magnet:

$$F_{ij} = -J_j \cdot \int_{h_0}^{h_1} \int_{r_0}^{r_1} \left\{ \int_C B_{iz}(x, y, \theta)\hat{Z}_S \times d\ell \right\} dr dh \qquad \text{(Equation 6)}$$

$$F_j = \sum_{i=1}^{N_m} F_{ij} \qquad \text{(Equation 7)}$$

where the symbol $\int_C$ denotes the line integral of the differential force. Also, since we know the position vector $r_i$ from the center of mass of the moving platform (the origin of platform's coordinates) to the ith magnet as the moment arm, the torque information can be formulated as well:

$$T_{ij} = r_j \times F_{ij} \qquad \text{(Equation 8)}$$

$$T_j = \sum_{i=1}^{N_m} (r_i \times F_{ij}) \qquad \text{(Equation 9)}$$

where $T_{ij}$ is the moment exerted on the moving platform by the interacting force between ith magnet and jth coil. For generating the force model for complete sets of coils, there will be $N_c = N_x \times N_y$ force and torque equations like in total. Concatenating all $N_c$ equations, we can obtain the force and torque model of the actuator in the moving platform's coordinates as:

$$\begin{bmatrix} F \\ T \end{bmatrix} = \begin{bmatrix} f_\alpha(x_1, y_1, \theta_1) & f_\alpha(x_2, y_2, \theta_2) & \cdots & f_\alpha(x_{N_c}, y_{N_c}, \theta_{N_c}) \\ f_\beta(x_1, y_1, \theta_1) & f_\beta(x_2, y_2, \theta_2) & \cdots & f_\beta(x_{N_c}, y_{N_c}, \theta_{N_c}) \\ g_z(x_1, y_1, \theta_1) & g_z(x_2, y_2, \theta_2) & \cdots & g_z(x_{N_c}, y_{N_c}, \theta_{N_c}) \end{bmatrix} \begin{bmatrix} J_1 \\ J_2 \\ \vdots \\ J_{N_c} \end{bmatrix} \text{ or} \qquad \text{[Equation 10]}$$

-continued $$\begin{bmatrix} F \\ T \end{bmatrix} = QJ \quad \text{(Equation 11)}$$

$$Q = \begin{bmatrix} f_\alpha(x_1, y_1, \theta_1) & f_\alpha(x_2, y_2, \theta_2) & \ldots & f_\alpha(x_{N_c}, y_{N_c}, \theta_{N_c}) \\ f_\beta(x_1, y_1, \theta_1) & f_\beta(x_2, y_2, \theta_2) & \ldots & f_\beta(x_{N_c}, y_{N_c}, \theta_{N_c}) \\ g_z(x_1, y_1, \theta_1) & g_z(x_2, y_2, \theta_2) & \ldots & g_z(x_{N_c}, y_{N_c}, \theta_{N_c}) \end{bmatrix} \quad \text{(Equation 12)}$$

$$J = \begin{bmatrix} J_1 \\ J_2 \\ \vdots \\ J_{N_c} \end{bmatrix} \quad \text{(Equation 13)}$$

where Q is the characteristic matrix for a certain platform position and orientation relative to the base, and J is the current density vector of electric currents passing through coil 1, coil 2, . . . , and coil $N_C$. Since there are only 4 independent current signals, Q can be further condensed to a 3×4 matrix, and J condensed to a 4×1 vector.

To solve the inverse model in closed form, in other words, to find the current signal intensities of those 4 phases J for a desired set of force and torque condition being exerted to the actuator, one is essentially solving a optimization problem:

$$\text{Minimize } \frac{1}{2} J^T W J \quad \text{(Equation 14)}$$

$$\text{Subject to } \begin{bmatrix} F \\ T \end{bmatrix} = QJ \quad \text{(Equation 15)}$$

where W is a 4×4 (since we have 4 current signal phases) positive definite matrix in the form of $$W = \begin{bmatrix} w_1 & 0 & 0 & 0 \\ 0 & w_2 & 0 & 0 \\ 0 & 0 & w_3 & 0 \\ 0 & 0 & 0 & w_4 \end{bmatrix} \quad \text{(Equation 16)}$$

where $w_1, w_2, w_3, w_4$ are positive weightings determined by coils' resistances. Using state-of-the-art techniques such as the minimum right-inverse solution, the control current inputs can be obtained as:

$$J = W^{-1} Q^T (Q W^{-1} Q^T)^{-1} \begin{bmatrix} F \\ T \end{bmatrix} \quad \text{(Equation 17)}$$

Notice that the condensed 3×4 characteristic matrix Q should be a full rank matrix, otherwise singularity may occur leading to no solution of the problem. When implementing the design, it is not recommended to set pitch of magnets ($l_M^\alpha$ or $l_M^\beta$) and pitch of coils ($l_S^\alpha$ or $l_S^\beta$) equal or with integer relation.

Figure 5:
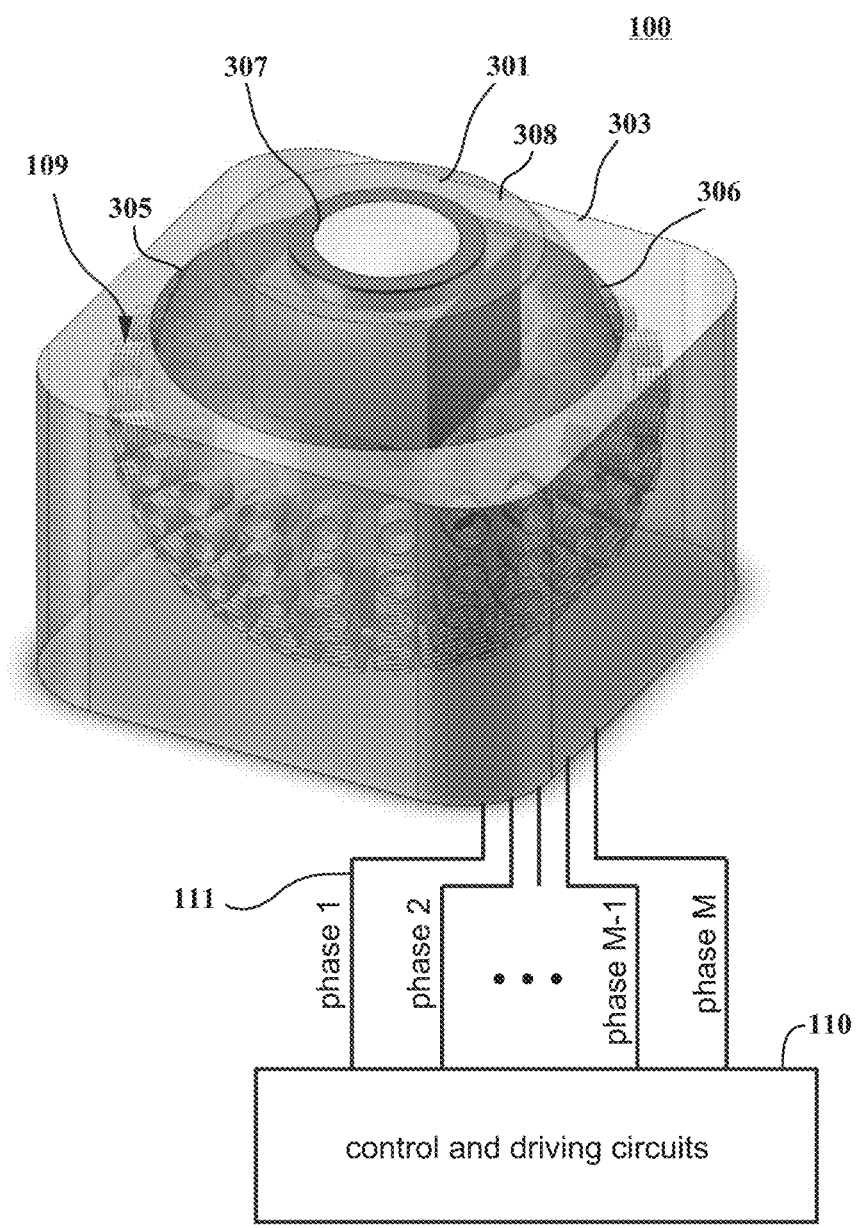
FIG. 5 illustrates a perspective view of another preferred embodiment of the present invention as a three-dimensional spherical motor.

Such method can be extended to three-dimensional. FIG. 5 depicts an exemplary preferred embodiment of the present invention as a three-dimensional spherical motor stage. The stage comprises a first body, the rotor platform 301, and a second body, the stator platform 303. The mating surface between the rotor platform 301 and the stator platform 303 is a spherical surface 305, and the rotor platform 301 can move relative to the stator platform 303 along this spherical surface 305 with three degrees of rotation. For example, as shown in FIG. 5, the rotor platform 301 is positioned within an interior cavity 306 defined by the spherical surface 305 formed within the stator platform 303 such that an air gap is formed therebetween.

Figure 6A:
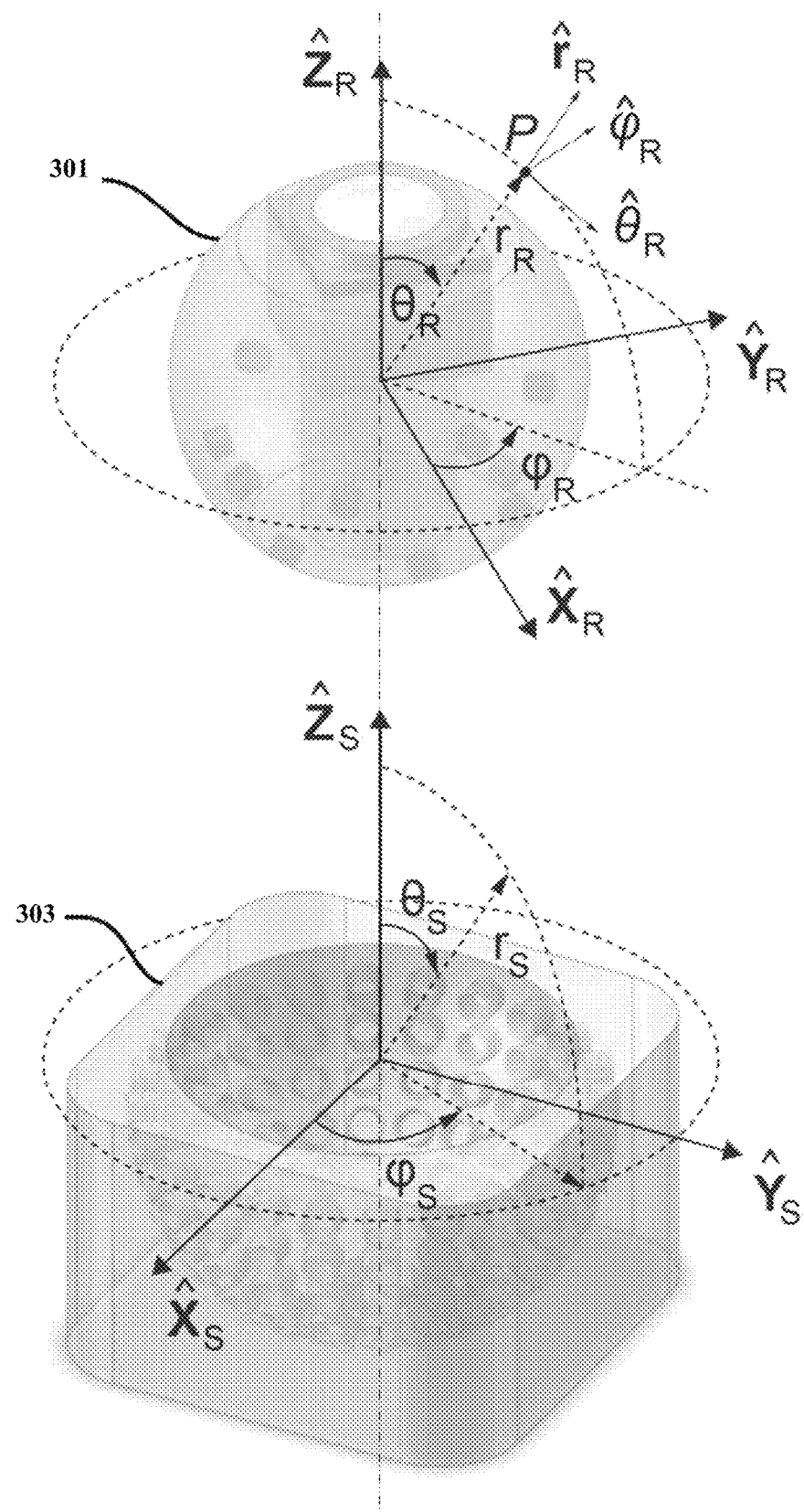
FIGS. 6A and 6B illustrate front and rear perspective views of an exploded configuration of the preferred embodiment design as illustrated in FIG. 5.
Figure 6B:
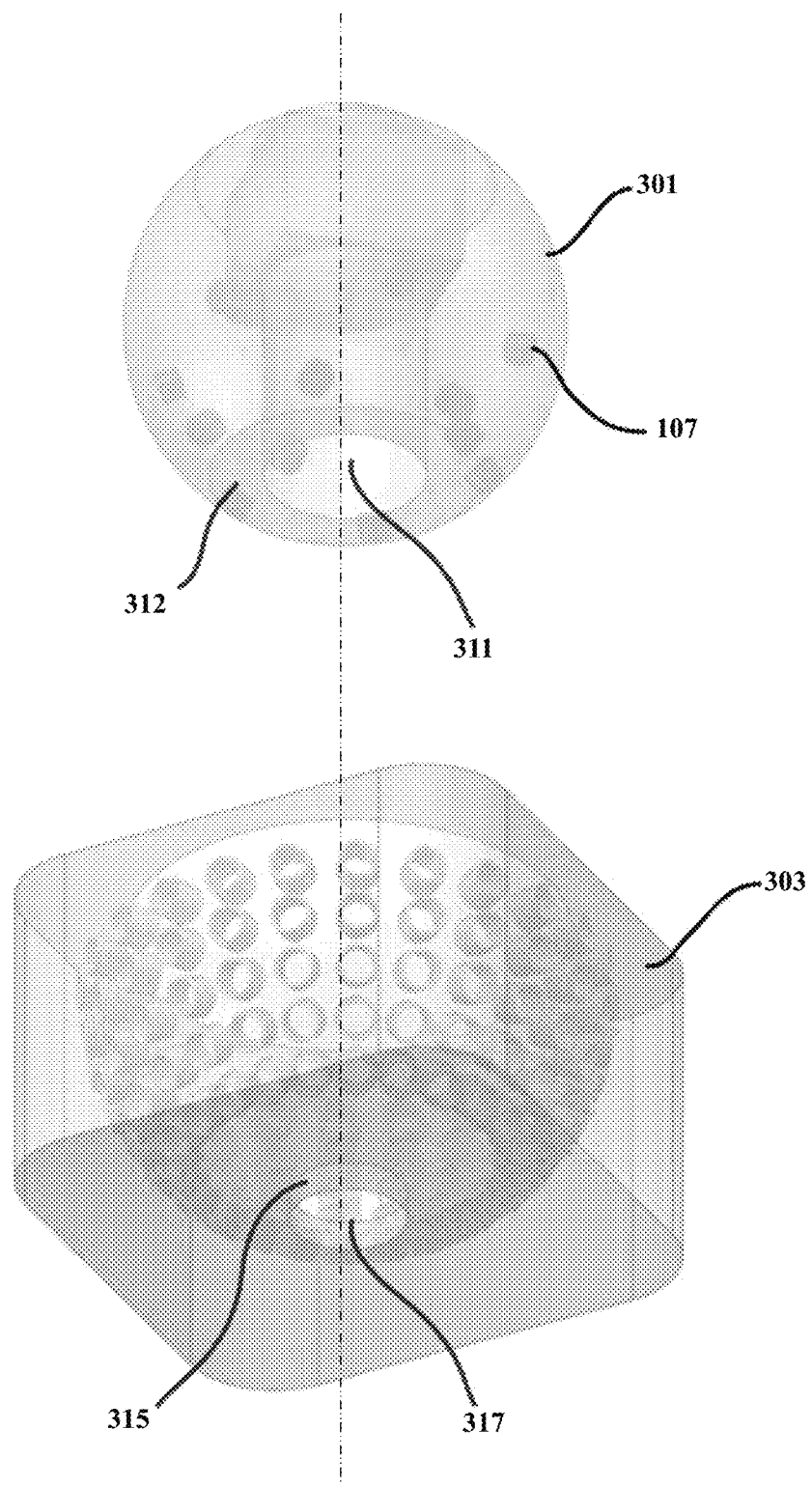

In yet another embodiment, additional device and/or component, such as a camera module 307, may be attached to a top end 308 of the rotor 301. The rotor may have a cable tube 311 (shown in FIG. 6B) extending therethrough to allow the cables of the camera module 307 to go through a bottom end 312 of the rotor 301, and all the way out of the stator platform 303 through a corresponding cable hole 317 extending through the stator platform 303. There can be limiting mechanism such as limiting flange 315 coupled to the stator platform 303 and positioned adjacent the to avoid over rotation of the 301, as shown in FIG. 6.

One may use a similar approach as stated above to solve the inverse electromagnetics for a three-dimensional problem, or using existing methods such as distributed multipole model. The coordinate transformations involved in the process would be between spherical coordinates and Cartesian coordinates (see FIG. 6), instead of between Cartesian coordinates in two-dimensional case.

Referring to FIG. 1, in one embodiment, the present invention includes a multi-degree-of-freedom motor system 100. The system 100 includes the rotor 101, the stator 103, and the controller 110. The rotor 101 includes a rotor body and a plurality of magnetic positioners 107 coupled to the rotor body. The stator 103 includes a stator housing and a plurality of electromagnetic coils 109 positioned within the stator housing.

In one embodiment, referring to FIG. 1, the stator housing includes an outer surface that defines a substantially planar mating surface defined between an outer surface of the rotor body and the outer surface of the stator housing. In another embodiment, referring to FIGS. 5, 6A, and 6B, the stator housing may include an outer surface that defines a spherical mating surface defined between an outer surface of the rotor body and the outer surface of the stator housing.

In the illustrated embodiment, the plurality of electromagnetic coils 109 are arranged in a plurality of coil groups 112. Each of the coil groups 112 including a predefined number of electromagnetic coils 109 being arranged in a predefined unit pattern 205 and/or 213. The controller 110 is configured to transmit control signals to each of the plurality of electromagnetic coils 109. In one embodiment, the controller 110 is configured to transmit the control signals including a number of driving signal phases 111 that is less than a total number of electromagnetic coils 109 included in the stator 103. For example, in one embodiment, the controller 110 may be configured to transmit the control signals including a number of driving signal phases 111 that is less than half of the total number of electromagnetic coils 109 included in the stator 103.

Referring to FIGS. 2 and 4, in the illustrated embodiment, the coil group 112 includes a first set 114 of electromagnet coils 109 spaced along a first direction 201 and a second set 116 of electromagnetic coils 109 spaced along a second direction 203 that is perpendicular to the first direction 201. As shown in FIG. 2, the first set 114 of electromagnetic coils 109 includes a first coil pitch size $1_S^\alpha$ is defined along the first direction 201. The second set 116 of electromagnetic coils 109 includes a second coil pitch size $1_S^\beta$ defined along the second direction 203. In one embodiment, as shown in FIG. 2, the first coil pitch size $1_S^\alpha$ is may be equal to the second coil pitch size $1_S^\beta$ such that the predefined pattern includes a substantially rectangular shape. Alternatively, as shown in FIG. 4, the second coil pitch size $1_S^\beta$ may be less than the first coil pitch size $1_S^\alpha$.

In one embodiment, the controller 110 may be configured to transmit a first driving phase, such as, for example driving phase 1 (shown in FIG. 1) to a pair of electromagnetic coils 109 including a first coil 118 and a second coil 120 (shown in FIG. 2). The controller 110 is configured to transmit the first driving phase 1 including a forward driving current, A, transmitted to the first coil 118 of the pair of electromagnetic coils 109 and a reverse driving current, A', transmitted to the second coil 120 of the pair of electromagnetic coils 109. In one embodiment, the coil group 112 includes a plurality of pairs of electromagnetic coils 109, each pair including a first coil 118 and a second coil 120. Each pair of electromagnet coils 109 is arranged within the unit pattern 205, 213 such that another electromagnet coil 109 of another pair of electromagnet coils 109 is positioned between the first and second coils 118 and 120, as shown in FIG. 2 and FIG. 4.

It will thus be seen that the objects set forth above, among those made apparent from the preceding description, are efficiently changes may be made in carrying out the above method and forth without departing from the spirit and scope of the all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

A controller, computing device, server or computer, such as described herein, may include at least one or more processors or processing units and a system memory. The controller typically also includes at least some form of computer readable media. a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBx, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A multi-degree-of-freedom motor system, comprising:
    a rotor including a rotor body and a plurality of magnetic positioners coupled to the rotor body, the rotor body including a spherical outer surface;
    a stator including a stator housing and a plurality of electromagnetic coils positioned within the stator housing, the stator housing including a spherical mating surface defining an interior cavity that is configured to receive the rotor body therein;
    wherein the plurality of electromagnetic coils are arranged in a plurality of coil groups, each coil group including a predefined number of electromagnetic coils being arranged in a predefined pattern, at least one coil group of the plurality of coil groups including a first set of electromagnet coils and a second set of electromagnet coils, the first set of electromagnet coils including a first coil pitch size defined along a first direction, the second set of electromagnetic coils including a second coil pitch size defined along a second direction that is different from the first direction, the second coil pitch size being different from the first coil pitch size; and a controller for transmitting control signals to each of the plurality of electromagnetic coils, the controller configured to transmit the control signals including a number of driving signal phases that is less than a total number of electromagnetic coils included in the stator.

2. The system of claim 1, wherein the controller is configured to transmit the control signals including a number of driving signal phases that is less than half of the total number of electromagnetic coils included in the stator.

3. The system of claim 1, wherein the first set of electromagnet coils includes a first pair of electromagnet coils including a first coil configured to receive a forward driving signal and a second coil configured to receive a reverse driving signal.

4. The system of claim 3, wherein the first set of electromagnet coils includes a second pair of electromagnet coils including a third coil configured to receive a second forward driving signal and a third coil configured to receive a second reverse driving signal.

5. The system of claim 4, wherein the third coil is positioned between the first coil and the second coil.

6. The system of claim 5, wherein the second set of electromagnet coils includes a third pair of electromagnet coils.

7. The system of claim 1, wherein the second coil pitch size is less than the first coil pitch size.

8. The system of claim 1, wherein the controller is configured to transmit a first driving phase to the first pair of electromagnetic coils, the first driving phase including a forward driving current transmitted to the first coil of the first pair of electromagnetic coils and a reverse driving current transmitted to the second coil of the first pair of electromagnetic coils.

9. The system of claim 1, wherein the stator housing includes a cable hole extending through an outer surface of the stator housing.

10. The system of claim 1, wherein each coil group includes a 4×4 array of electromagnetic coils.

11. A method of assembling a multi-degree-of-freedom motor system, including the steps of:

providing a rotor including a rotor body, the rotor body including a spherical outer surface;

coupling a plurality of magnetic positioners to the rotor body;

providing a stator including a stator housing, the stator housing including a spherical mating surface defining an interior cavity that is configured to receive the rotor body therein;

coupling a plurality of electromagnetic coils to the stator housing, the plurality of electromagnetic coils being positioned within the stator housing, wherein the plurality of electromagnetic coils are arranged in a plurality of coil groups, each coil group including a predefined number of electromagnetic coils being arranged in a predefined pattern, at least one coil group of the plurality of coil groups including a first set of electromagnet coils and a second set of electromagnet coils, the first set of electromagnet coils including a first coil pitch size defined along a first direction, the second set of electromagnetic coils including a second coil pitch size defined along a second direction that is different from the first direction, the second coil pitch size being different from the first coil pitch size; and coupling a controller in communication with each the plurality of electromagnetic coils, wherein the controller transmits control signals to each of the plurality of electromagnetic coils and is configured to transmit the control signals including a number of driving signal phases that is less than a total number of electromagnetic coils included in the stator.

12. The method of claim 11, wherein the controller is configured to transmit the control signals including a number of driving signal phases that is less than half of the total number of electromagnetic coils included in the stator.

13. The method of claim 11, wherein the first set of electromagnet coils includes a first pair of electromagnet coils including a first coil configured to receive a forward driving signal and a second coil configured to receive a reverse driving signal.

14. The method of claim 13, wherein the first set of electromagnet coils includes a second pair of electromagnet coils including a third coil configured to receive a second forward driving signal and a third coil configured to receive a second reverse driving signal.

15. The method of claim 14, wherein the third coil is positioned between the first coil and the second coil.

16. The method of claim 11, wherein the second coil pitch size is less than the first coil pitch size.

17. The method of claim 11, wherein the controller is configured to transmit a first driving phase to the first pair of electromagnetic coils, the first driving phase including a forward driving current transmitted to the first coil of the first pair of electromagnetic coils and a reverse driving current transmitted to the second coil of the first pair of electromagnetic coils.

18. The method of claim 11, wherein the stator housing includes a cable hole extending through an outer surface of the stator housing.

19. The method of claim 11, wherein each coil group includes a 4×4 array of electromagnetic coils.

20. A camera assembly, comprising:

a rotor including a rotor body and a plurality of magnetic positioners coupled to the rotor body, the rotor body including a spherical outer surface;

a camera module coupled to the rotor;

a stator including a stator housing and a plurality of electromagnetic coils positioned within the stator housing, the stator housing including a spherical mating surface defining an interior cavity that is configured to receive the rotor body therein;

wherein the plurality of electromagnetic coils are arranged in a plurality of coil groups, each coil group including a predefined number of electromagnetic coils being arranged in a predefined pattern, at least one coil group of the plurality of coil groups including a first set of electromagnet coils and a second set of electromagnet coils, the first set of electromagnet coils including a first coil pitch size defined along a first direction, the second set of electromagnetic coils including a second coil pitch size defined along a second direction that is different from the first direction, the second coil pitch size being different from the first coil pitch size; and a controller for transmitting control signals to each of the plurality of electromagnetic coils, the controller configured to transmit the control signals including a number of driving signal phases that is less than a total number of electromagnetic coils included in the stator.

\* \* \* \* \*